United States Patent
Greene et al.

(10) Patent No.: US 7,885,938 B1
(45) Date of Patent: Feb. 8, 2011

(54) TECHNIQUES FOR GRANULAR RECOVERY OF DATA FROM LOCAL AND REMOTE STORAGE

(75) Inventors: Christopher Greene, Longwood, FL (US); Derek D. Dickinson, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 347 days.

(21) Appl. No.: 12/038,367

(22) Filed: Feb. 27, 2008

(51) Int. Cl.
*G06F 7/00* (2006.01)
*G06F 17/00* (2006.01)

(52) U.S. Cl. .................. 707/674; 707/726; 707/800

(58) Field of Classification Search ............... 707/674, 707/686, 999.202, 726, 800
See application file for complete search history.

(56) References Cited

U.S. PATENT DOCUMENTS

| | | | |
|---|---|---|---|
| 5,721,918 A * | 2/1998 | Nilsson et al. | 707/999.202 |
| 6,065,018 A * | 5/2000 | Beier et al. | 707/610 |
| 6,480,970 B1 * | 11/2002 | DeKoning et al. | 714/6 |
| 6,697,960 B1 * | 2/2004 | Clark et al. | 714/15 |
| 7,536,585 B1 * | 5/2009 | Keeton et al. | 714/6 |
| 2005/0193248 A1 * | 9/2005 | Idei et al. | 714/13 |
| 2005/0273654 A1 * | 12/2005 | Chen et al. | 714/13 |
| 2007/0180207 A1 * | 8/2007 | Garfinkle | 711/162 |
| 2007/0220308 A1 * | 9/2007 | Yeung et al. | 714/5 |
| 2007/0220311 A1 * | 9/2007 | Lewin et al. | 714/6 |

OTHER PUBLICATIONS

U.S. Appl. No. 11/967,667, filed Dec. 31, 2007.

* cited by examiner

*Primary Examiner*—Jean M Corrielus
*Assistant Examiner*—Phong Nguyen
(74) *Attorney, Agent, or Firm*—Hunton & Williams, LLP

(57) ABSTRACT

Techniques for granular recovery of data from local and remote storage are disclosed. In one particular exemplary embodiment, the techniques may be realized as a method for recovery of data from local and remote storage comprising determining a recovery location, determining a location of backup data, hard linking one or more portions of the backup data to the recovery location in the event that the one or more portions of the backup data to be hard linked are determined to be on a volume of the recovery location, virtually linking one or more portions of the backup data to the recovery location in the event that the one or more portions of the backup data to be virtually linked are determined to be on a volume different from the volume of the recovery location, and performing recovery utilizing one or more portions of recovery data.

18 Claims, 2 Drawing Sheets

TECHNIQUES FOR GRANULAR RECOVERY OF DATA FROM LOCAL AND REMOTE STORAGE

FIELD OF THE DISCLOSURE

The present disclosure relates generally to data recovery and, more particularly, to techniques for granular recovery of data from local and remote storage.

BACKGROUND OF THE DISCLOSURE

Backing up data may require significant storage space.

Backups may utilize incremental backup strategies. Incremental backup strategies may require a separate file or log for each incremental backup. These separate files or logs may all be stored on separate disks, volumes, servers or other storage devices. Recovering data from an application utilizing such incremental backup strategies may require a full backup set. Additionally, a recovery may require a full backup set, which may include multiple backup files, to be stored on a single volume, a single device or partition. Managing disk space for one or more applications being backed up is increasingly more challenging due to the growing size of backups and the requirements of recovery processes utilizing those backups. While backup files may be distributed across devices, volumes, servers, or partitions, recovery may require enough storage for multiple backup files in a single logical storage location. Additionally, copying or moving one or more files to a single location may add extra time to a recovery process due to large file sizes.

In view of the foregoing, it may be understood that there are significant problems and shortcomings associated with current data recovery technologies.

SUMMARY OF THE DISCLOSURE

Techniques for granular recovery of data from local and remote storage are disclosed. In one particular exemplary embodiment, the techniques may be realized as a method for recovery of data from local and remote storage. The method may comprise determining a recovery location, determining a location of backup data, hard linking one or more portions of the backup data to the recovery location in the event that the one or more portions of the backup data to be hard linked are determined to be on a volume of the recovery location, virtually linking one or more portions of the backup data to the recovery location in the event that the one or more portions of the backup data to be virtually linked are determined to be on a volume different from the volume of the recovery location, and performing recovery utilizing one or more portions of recovery data.

In another particular exemplary embodiment, the techniques may be realized as an article of manufacture for recovery of data from local and remote storage, wherein the article of manufacture comprises at least one processor readable carrier and instructions carried on the at least one carrier. The instructions may be configured to be readable from the at least one carrier by at least one processor and thereby cause the at least one processor to operate so as to determine a recovery location, determine a location of backup data, hard link one or more portions of the backup data into the recovery location in the event that the one or more portions of the backup data to be hard linked are determined to be on a volume of the recovery location, virtually link one or more portions of the backup data into the recovery location in the event that the one or more portions of the backup data to be virtually linked are determined to be on a volume different from the volume of the recovery location, and perform recovery utilizing one or more portions of recovery data.

In yet another particular exemplary embodiment, the techniques may be realized as a system for recovery of data from local and remote storage. The system may comprise one or more processors communicatively coupled to a server, wherein the server may be configured to determine a recovery location, determine a location of backup data, hard link one or more portions of the backup data into the recovery location in the event that the one or more portions of the backup data to be hard linked are determined to be on a volume of the recovery location, virtually link one or more portions of the backup data into the recovery location in the event that the one or more portions of the backup data to be virtually linked are determined to be on a volume different from the volume of the recovery location, and perform recovery utilizing one or more portions of recovery data.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
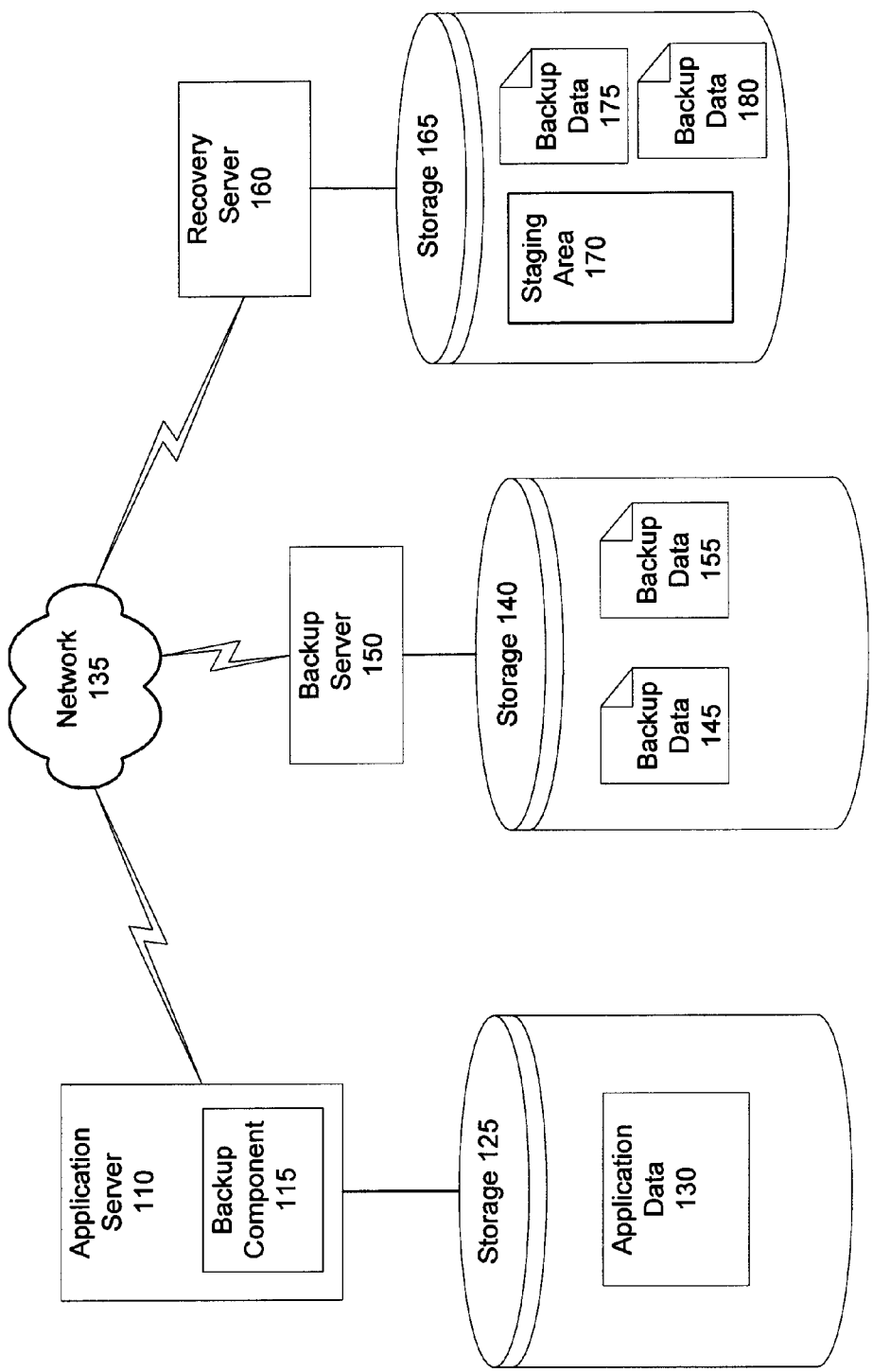
FIG. 1 shows a system for granular recovery of data from local and remote storage in accordance with an embodiment of the present disclosure.

Referring to FIG. 1, there is shown a system 100 for granular recovery of data from local and remote storage in accordance with an embodiment of the present disclosure.

Application server 110 may be a server hosting one or more applications. Backup component 115 may facilitate backup of application server 110. Application server 110 may be communicatively coupled to storage 125. Storage 125 may be storage that may be utilized by application server 110 to store application data 130, or other data associated with application server 110 or backup component 115. Application server 110 may be communicatively coupled to network 135. One or more additional devices may be communicatively coupled to network 135, such as backup server 150 and recovery server 160. Backup server 150 may be communicatively coupled to storage 140. Storage 140 may contain backup data 145. Recovery server 160 may be communicatively coupled to storage 165. Storage 165 may contain staging area 170, backup data 175, and backup data 180.

Application server 110 may be a server, a laptop, or other computer capable of supporting one or more applications.

Applications may include, for example, Microsoft Exchange™, other email applications, workgroup applications, file sharing applications, and other applications enabling the creation of application data. Application server 110 may enable a user to create application data such as, for example, an email, a document, a list, an image file, a posting, a web page, xml data, a sound file, and a video file, or other application data. Application server 110 may utilize platforms or storage mechanisms such as databases or file systems which may utilize storage 125.

Backup component 115 may be a backup process, job, device or mechanism utilized to ensure one or more portions of application data is backed up. In some, embodiments, backup component 115 may be an input/output (I/O) redirector, a splitter or another device or process utilized to replicate transactions directed to storage 125 to one or more secondary storage devices. Backup component 115 may enable snapshots of backup data, exporting of backup data, the running of backup jobs and other processes ensuring data backup and integrity.

Storage 125, 140, and 165 may be local, remote, or a combination thereof to application server 110. Storage 125, 140, and 165 may utilize a redundant array of inexpensive disks (RAID), a redundant array of inexpensive nodes (RAIN), tape, disk, a storage area network (SAN), or other computer accessible storage. Storage 125 may contain application data 130.

Application data 130 may include data written by one or more applications hosted by application server 110. Application data 130 may contain one or more user created data files such as, for example, a document, a list, an image file, an email, a posting, a web page, xml data, a sound file, and a video file. Application data may be stored in one or more formats or data structures. Data structures may be determined by an underlying platform or system supporting an application.

Network 135 may be a local area network (LAN), a wide area network (WAN), the Internet, a cellular network, a satellite network, or other networks that permit communication between application server 110 and other devices operatively connected to network 135, such as recovery server 160 and backup server 150.

Backup server 150 may process one or more backup requests and may provide backup services to one or more hosts, such as, for example, application server 110. Backup server 150 may utilize storage 140 for backup data 145 and 150. Backup server 150 may utilize other storage such as storage 165 for backup data storage. Backup data 145, 150, 175 and 180 may contain logs, files, or other data structures containing backed up application data. Backup data 145, 150, 175 and 180 may also contain recovery files which may be delta files containing changes that would be written to an application data store or a database during recovery.

Storage 140 may host a staging area for recovery, and backup server 150 may run a recovery process. If a last portion of a backup set, such as a last log file or a current log file, resides on storage 140, performance may be improved by utilizing storage 140 for recovery. In one or more embodiments, a recovery process may modify a last log and/or a current log as part of the recovery process. Thus, a last or current log may be copied and preserved to preserve the integrity of the backup set. The performance of the copying of a current or last log may be improved by locating the staging area at the location of the last or current log. A new current and/or last log generated as part of the recovery process may be saved as part of the recovery data. In some embodiments, a current or last log may be virtualized and performance may be unaffected by locating a staging area in a location different from the last or current log.

Recovery server 160 may be a separate device, such as a server, from application server 110. Recovery server 160 may enable a backup server or an application server to avoid the processing burden that may be associated with recovery. In one or more embodiments, recovery server 160 may be a process and may run on application server 110 or on one or more additional servers or devices. Recovery Server 160 may utilize a virtual file filter driver, a continuous data protection and replication (CDP/R) appliance or other methods to virtualize data. Recovery server 160 may utilize storage 165 to host staging area 170. Storage 165 may also contain one or more data files such as backup data 175 and backup data 180. Recovery server 160 may enable the running of one or more recovery processes and the instantiation of an application utilizing a recovered data store.

Staging area 170 may represent storage space utilized for the recovery of one or more application data stores. Staging area 170 may facilitate the restoration of application data stores, such as databases. Staging area 170 may enable an application server or a backup server to avoid the burden associated with storing one or more data files for the restoration of a data store.

Figure 2:
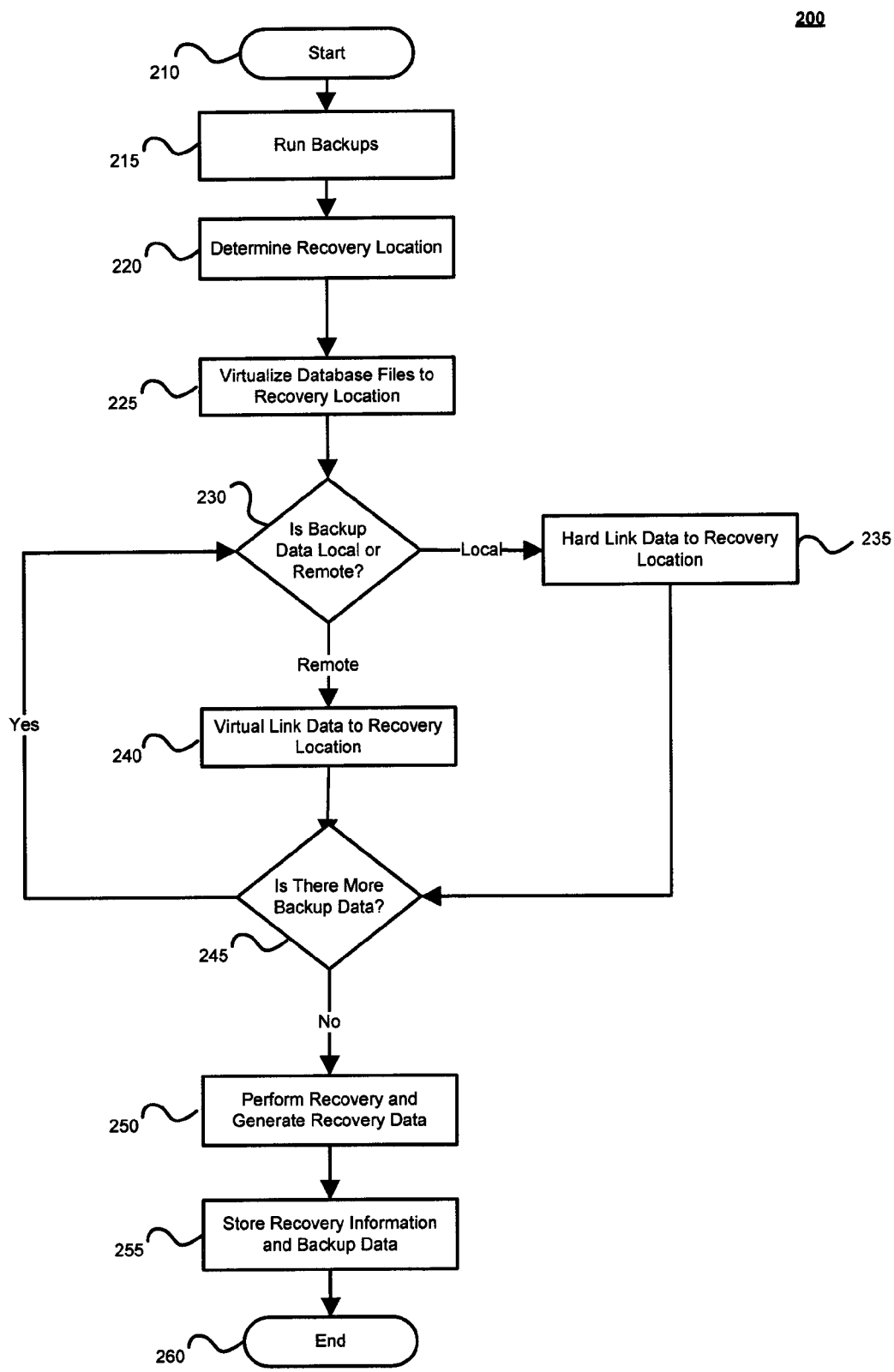
FIG. 2 shows a method for granular recovery of data from local and remote storage in accordance with an embodiment of the present disclosure.

Referring to FIG. 2, there is shown a method 200 for granular recovery of data from local and remote storage in accordance with an embodiment of the present disclosure. At block 210, the method 200 for granular recovery of data from local and remote storage may begin.

At block 215, one or more backup processes may be run. For example, backup component 115 may run a full backup and backup data may be exported to storage 140. The full backup may be stored as backup data 145. Additional backup processes may be run, such as, for example, incremental backups which may be run periodically. Backup data 155, 175 and 180 may represent incremental backups.

At block 220, a recovery may be desired and a recovery location may be chosen. The determination of a recovery location may be based at least in part on the support of a file system of the potential recovery location for virtual linking. Certain file systems, such as the file allocation table (FAT) file system may not easily support virtual linking. Thus a volume or a disk running FAT may not be chosen as a location for recovery. Other files systems such as the new technology file system (NTFS) may easily support virtual linking. Thus, in this example a NTFS volume may be preferred over a volume using FAT. A file system on a volume, a drive, a partition, or other logical storage unit may be evaluated for its support for hard linking. Additional factors may be considered when determining a recovery location. For example, the presence of the last data backup portion on a potential recovery location may improve performance of recovery. A recovery location may also be chosen in part by the quantity of backup portions on a potential recovery location, and the size of one or more portions of backup data on a potential recovery location. When determining a recovery location available resources of the potential recovery location may be evaluated. For example, when evaluating resources of a potential recovery location, factors evaluated may include processing capability associated with the storage, available free space on the storage, storage access time, and file system permissions. In one or more embodiments, determining a location of one or more portions of backup data may occur prior to backup of one or more data files by analyzing one or more of these factors to minimize recovery time. Thus data may be backed up to one or more volumes based at least in part on their suitability as a potential recovery location.

In some embodiments, if a location storing backup files cannot support recovery, a temporary staging area may be created as a recovery location. For example, storage 140 may not support recovery due to file system incompatibility with hard linking, virtual linking, limited available storage space on storage 140 or for other factors. Staging area 170 may be created on storage 165 in order to support recovery and one or more backup data or other files may be virtualized into staging area 170.

In one or more embodiments, virtual linking may include creating a symbolic link to a file. The symbolic link may be to the same file system or volume or may be to a remote file system or volume. Virtual linking may utilize network file system (NFS) mounted volumes, volumes mounted using SAMBA, or other volumes accessible via a network. Virtual linking may also include virtual links to read only files, partitions or volumes. In one or more embodiments, virtual linking may utilize a continuous data protection and replication (CDP/R) appliance to virtualize a file.

At block 225, one or more database files may be virtualized to a recovery location. For example, files associated with a full backup may be virtualized into a recovery location. A file filter may enable virtualization of one or more portions of a file system. A file filter may intercept one or more file system requests and may enable the requests to be redirected to other file system locations and/or files. For example, a recovery process may use a virtual file filter driver which may read one or more uncommitted transactions in one or more log files and may write the desired database updates to one or more recovery files as metadata. This may enable a recovery process to run and to write updates and/or transactions to a recovery file instead of a database file. Use of virtualized files may enable recovery processes to be run on snapshot or read only files, directories or volumes. Write requests to virtualized files may be redirected to a writable file, such as a change log or a delta file, by the virtual file filter driver. The virtual file filter driver may determine whether read requests should be directed to the read only file or whether data needs to be provided from a change log.

At block 230, the method 200 may determine the location of one or more backup data files relative to a recovery location. If a backup data file is determined to be local, the method may continue at block 235. If a backup data file is determined to be remote, the method may continue at block 240. In one or more embodiments, a backup file will be considered local if it resides on the same storage volume as a recovery location. For example, backup data files 175 and 180 may be on the same volume as staging area 170 and may be considered local. Backup data files 145 and 155 may be determined to be on a remote volume from the volume of staging area 170.

At block 235, one or more backup files may be hard linked into the recovery location. For example, backup data files 175 and 180 may be hard linked into staging area 170. Hard linking the files may provide better performance than virtual linking.

At block 240, one or more backup files may be virtually linked into the recovery location. For example, backup data 145 and 155 may be virtually linked into staging area 170.

At block 245, the method 200 may determine if additional files need to be linked into a recovery location. If so, the method may return to block 230. If no additional files are necessary for recovery, the method 200 may continue at block 250. In one or more embodiments, if one or more backup data files are located on a file system not supporting linking they may be copied to the recovery location.

At block 250, the method 200 may perform recovery and may generate recovery data. Recovery data may contain information regarding transactions to be committed to a data store or a database. Recovery data may be written as XML, text or in other formats accessible by a restoration process.

At block 255, the method 200 may store recovery information and may backup data. Recovery data may be written to backup location as opposed to a temporary storage location. This may ensure that recovery data persists and is not lost when a temporary staging area is removed. For example, if recovery is performed utilizing staging area 170, recovery data may be located in a directory, partition, volume or other location associated with backup data, such as storage 140.

At block 260, method 200 may end.

After information is recovered, backup data may be analyzed. If one or more redundant backup data files exist they may be deleted. For example, if a last log file and a current log file exist they may be compared to determine if they are redundant. A generation number or other indicator associated with each file may be utilized for the comparison. If the numbers or indicators match, the last log file may be deleted.

Backup data and/or recovery data may be virtualized. Storage of recovery data may enable restoration operations to open a data store or a database utilizing virtualized backup files and virtualized recovery data. The utilization of virtualized backup and recovery data may make a data store or database appear to be recovered and may enable the instantiation of an application utilizing the virtualized backup and recovery data. After an application is instantiated, one or more data files may be obtained and restored to a production application or to another location accessible to a restoration process.

At this point it should be noted that granular recovery of data from local and remote storage in accordance with the present disclosure as described above typically involves the processing of input data and the generation of output data to some extent. This input data processing and output data generation may be implemented in hardware or software. For example, specific electronic components may be employed in an electronic circuit for file recovery or similar or related circuitry for implementing the functions associated with file recovery in accordance with the present disclosure as described above. Alternatively, one or more processors operating in accordance with stored instructions may implement the functions associated with granular recovery of data from local and remote storage in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of envi-

The invention claimed is:

1. A method for recovery of data from local and remote storage comprising:
   determining a recovery location;
   determining a location of backup data;
   hard linking one or more portions of the backup data to the recovery location in the event that the one or more portions of the backup data to be hard linked are determined to be on a volume of the recovery location, wherein hard linking does not require copying the backup data;
   virtually linking one or more portions of the backup data to the recovery location in the event that the one or more portions of the backup data to be virtually linked are determined to be on a volume different from the volume of the recovery location, wherein virtually linking does not require copying the backup data; and
   performing recovery utilizing one or more portions of recovery data, wherein one or more portions of the backup data located on a file system not supporting linking are copied to the recovery location.

2. The method of claim 1, wherein determining a recovery location is based at least in part on at least one of: support of a file system of a potential recovery location for virtual linking, support of a file system of a potential recovery location for hard linking, presence of a last data backup portion on a potential recovery location, quantity of backup portions on a potential recovery location, size of one or more portions of backup data on a potential recovery location, and available resources of a potential recovery location.

3. The method of claim 2, wherein determining a recovery location includes analyzing one or more factors to minimize recovery time.

4. The method of claim 2, further comprising determining a location of one or more portions of the backup data prior to backup by analyzing one or more factors to minimize recovery time.

5. The method of claim 2, wherein available resources of a potential recovery location comprise at least one of: processing capability associated with the storage, available free space on the storage, storage access time, and file system permissions.

6. The method of claim 1, further comprising setting up a temporary staging area.

7. The method of claim 1, wherein one or more portions of the backup data comprise one or more log files.

8. The method of claim 1, wherein performing recovery comprises generating a new data file and generating a recovery file.

9. At least one processor readable carrier for storing a computer program of instructions configured to be readable by at least one processor for instructing the at least one processor to execute a computer process for performing the method as recited in claim 1.

10. An article of manufacture for recovery of data from local and remote storage, the article of manufacture comprising:
    at least one non-transitory processor readable storage medium; and
    instructions carried on the at least one storage medium;
    wherein the instructions are configured to be readable from the at least one storage medium by at least one processor and thereby cause the at least one processor to operate so as to:
    determine a recovery location;
    determine a location of backup data;
    hard link one or more portions of the backup data into the recovery location in the event that the one or more portions of the backup data to be hard linked are determined to be on a volume of the recovery location, wherein hard linking does not require copying the backup data;
    virtually link one or more portions of the backup data into the recovery location in the event that the one or more portions of the backup data to be virtually linked are determined to be on a volume different from the volume of the recovery location, wherein virtually linking does not require copying the backup data; and
    perform recovery utilizing one or more portions of recovery data, wherein one or more portions of the backup data located on a file system not supporting linking are copied to the recovery location.

11. A system for recovery of data from local and remote storage comprising:
    one or more processors communicatively coupled to a server;
    wherein the server is configured to:
    determine a recovery location;
    determine a location of backup data;
    hard link one or more portions of the backup data into the recovery location in the event that the one or more portions of the backup data to be hard linked are determined to be on a volume of the recovery location, wherein hard linking does not require copying the backup data;
    virtually link one or more portions of the backup data into the recovery location in the event that the one or more portions of the backup data to be virtually linked are determined to be on a volume different from the volume of the recovery location, wherein virtually linking does not require copying the backup data; and
    perform recovery utilizing one or more portions of recovery data, wherein one or more portions of the backup data located on a file system not supporting linking are copied to the recovery location.

12. The system of claim 11, wherein the determination of a recovery location is based at least in part on at least one of: support of a file system of a potential recovery location for virtual linking, support of a file system of a potential recovery location for hard linking, presence of a last data backup portion on a potential recovery location, quantity of backup portions on a potential recovery location, size of one or more portions of backup data on a potential recovery location, and available resources of a potential recovery location.

13. The system of claim 12, wherein determining a recovery location includes analyzing one or more factors to minimize recovery time.

14. The system of claim 12, wherein the server is further configured to: determine a location of the one or more portions of backup data prior to backup by analyzing one or more factors to minimize recovery time.

15. The system of claim 12, wherein available resources of a potential recovery location comprise at least one of: processing capability associated with the storage, available storage, storage access time, and file system permissions.

16. The system of claim 11, wherein the server is further configured to: set up a temporary staging area.

17. The system of claim 11, wherein the one or more portions of the backup data comprise one or more log files.

18. The system of claim 11, wherein performing recovery comprises generating a new data file and generating a recovery file.

* * * * *